(12) United States Patent
Akimoto et al.

(10) Patent No.: US 6,534,204 B1
(45) Date of Patent: Mar. 18, 2003

(54) MAGNETIC STORAGE MEDIUM

(75) Inventors: Hideyuki Akimoto, Kawasaki (JP); Yuki Yoshida, Kawasaki (JP); Kenji Sato, Kawasaki (JP); Iwao Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/405,725

(22) Filed: Sep. 24, 1999

(30) Foreign Application Priority Data

Mar. 23, 1999 (JP) .......................................... 11-077741

(51) Int. Cl.$^7$ ............................. G11B 5/66; G11B 5/70
(52) U.S. Cl. ...................... 428/694 TM; 428/694 TC; 428/694 TS; 428/900
(58) Field of Search .................... 428/694 TM, 694 TS, 428/694 TP, 694 MM, 694 TC, 900

(56) References Cited

U.S. PATENT DOCUMENTS

| | | | | |
|---|---|---|---|---|
| 4,621,030 A | * | 11/1986 | Uesaka et al. .............. 428/607 |
| 5,436,777 A | * | 7/1995 | Soeya et al. ................ 360/113 |
| 5,587,235 A | * | 12/1996 | Suzuki et al. ............... 428/332 |
| 5,605,733 A | * | 2/1997 | Ishikawa et al. ........... 428/65.3 |
| 5,717,662 A | * | 2/1998 | Nishimura .................... 369/13 |
| 5,851,643 A | * | 12/1998 | Honda et al. ............... 428/212 |
| 5,896,350 A | * | 4/1999 | Tamanoi et al. .............. 369/13 |
| 5,900,324 A | * | 5/1999 | Moroishi et al. ........... 428/611 |
| 5,965,285 A | * | 10/1999 | Mihara et al. ....... 428/694 ML |
| 6,090,496 A | * | 7/2000 | Kanazawa et al. .......... 428/617 |

\* cited by examiner

*Primary Examiner*—Holly C. Rickman
(74) *Attorney, Agent, or Firm*—Greer, Burns & Crain, Ltd.

(57) ABSTRACT

There is provided a magnetic storage medium capable of recording information at high recording density and also regenerating the information with a high quality of signal (high $S/N_m$), and in addition contributing to the elongation of a life span of the recorded information. The magnetic storage medium comprises a non-magnetic substrate, a plurality of magnetic recording layers of ferromagnetism formed on the non-magnetic substrate, and a dividing layer of antiferromagnetism for dividing said plurality of magnetic recording layers from one another through intervening between the magnetic recording layer-to-layer.

18 Claims, 2 Drawing Sheets

MAGNETIC STORAGE MEDIUM

BACKGROUND OF THE INVENTION

1. Field of the Invention

The present invention relates to a magnetic storage medium suitable for a magnetic disk unit for performing recording and regeneration of information.

2. Description of the Prior Art

As recording information, which is dealt with in an information processing apparatus, is increased, it is needed to provide a magnetic storage, which is used as an external storage unit of the information processing apparatus, with a compactness and the more large capacity. For this reason, the magnetic storage needs a magnetic storage medium capable of recording at high recording density.

Generally, a magnetic storage medium has a magnetic recording layer on which magnetic information is recorded. A one bit of magnetic information is represented by a direction of a total magnetization consisting of an assembly of the respective magnetizations of a plurality of ferromagnetic crystal particles existing in a one bit cell of the magnetic recording layer. The respective magnetizations of the plurality of ferromagnetic crystal particles are substantially unified in direction in the state that magnetic information is recorded. However, in the event that the magnetization of the adjacent one bit cell is unified in direction opposite to that of the noticed one bit cell, the direction of the magnetization is reversed through a certain width near a boundary between the adjacent one bit cell-to-one bit cell, but not rapidly changed on the boundary. In an area having such a width, magnetizations oriented in mutually different direction are mixed on a zigzag basis. This area is referred to as a magnetization transitional region. In order to satisfactorily reproduce magnetic information which is recorded on a magnetic recording layer of a magnetic storage medium at high recording density, there is a need to prepare a small width of the magnetization transitional region.

It is known that the width of the magnetization transitional region is narrower as the thickness of the magnetic recording layer of the magnetic storage medium is decreased. Hence, hitherto, there is made an attempt that the thickness of the magnetic recording layer is decreased, and there is proposed a magnetic storage medium having a multiple zone of magnetic recording layer in which the above-mentioned magnetic recording layer is divided with a non-magnetic layer.

However, according to the conventional magnetic storage medium, it is known that as magnetic information is recorded at higher recording density, $S/N_m$ of the recorded magnetic information to the regenerative signal is lowered (the medium noise $N_m$ is increased with respect to the output S of the regenerative signal).

One of the causes of occurrence of the medium noise resides in unevenness of a particle size of the ferromagnetic crystal particles. It is considered that the regenerative output is in proportion to the sum total of the volume of ferromagnetic crystal particles. Hence, as the average particle size of one bit cell becomes large, unevenness of a particle size becomes also large. As a result, unevenness of the regenerative output becomes large and thus the medium noise is increased. Therefore, it is considered that the medium noise $N_m$ of the magnetic storage medium is decreased in such a manner that the particle size of the ferromagnetic crystal particles is controlled in the magnetic recording layer of the magnetic storage medium, so that $S/N_m$ is improved.

In this manner, with the thinner magnetic recording layer and the smaller particle size of the ferromagnetic crystal particles in the magnetic recording layer, a signal representative of magnetic information may be regenerated with higher $S/N_m$. For example, when the magnetic recording layer is given 10 nm or so in thickness and the particle size is given 8 nm to 10 nm or so in an in-plane direction of the magnetic recording layer, it is considered that even a signal representative of magnetic information recorded in high recording density on the order of 10 G bit/inch$^2$ may be regenerated with high $S/N_m$.

However, As the thickness of the magnetic recording layer as well as the particle size of the ferromagnetic crystal particles are decreased, energy $K_u \cdot V$ (anisotropy energy× volume of particle) representative of a degree of easy orientation of magnetization of the particle into a predetermined direction is reduced. When the energy $K_u \cdot V$ is reduced, a thermal fluctuation phenomenon wherein a direction of magnetization fluctuates owing to the heat will occur. The behavior of the thermal fluctuation phenomenon is determined by ratio of the energy $K_u \cdot V$ to thermal energy $K_B \cdot T$ (Boltzmann constant×absolute temperature). Assuming that the thickness of the magnetic recording layer of the conventional magnetic storage medium and the particle size are given by the above-mentioned values, the ratio becomes a small value of the order of 40 to 100 or so at the room temperature (T=300 K). In a case where the ratio is a small value, there occurs the thermal fluctuation phenomenon in magnetization of each of the ferromagnetic crystal particles. Thus, a magnitude of the recording magnetization on one bit cell consisting of the total sum of pieces of magnetization is attenuated. This is associated with a problem that it is difficult to stably maintain for long time magnetic information represented by the recording magnetization.

SUMMARY OF THE INVENTION

In view of the foregoing, it is an object of the present invention to provide a magnetic storage medium capable of recording information at high recording density and also to regenerating the information with a high quality of signal (high $S/N_m$), and in addition contributing to the elongation of a life span of the recorded information.

To achieve the above-mentioned objects, the present invention provides a magnetic storage medium comprising:

(1) a non-magnetic substrate;

(2) a plurality of magnetic recording layers of ferromagnetism; and (3) a dividing layer of antiferromagnetism for dividing said plurality of magnetic recording layers from one another through intervening between the magnetic recording layer-to-layer.

According to the magnetic storage medium of the present invention as mentioned above, the plurality of magnetic recording layers of ferromagnetism of the item (2) are divided by the dividing layer of the item (3). Thus, each of the divided individual layers of the magnetic recording layers is thinner as compared with a non-divided magnetic recording layer. Generally, in a magnetic storage medium, a width of a magnetization transitional region of a magnetic recording layer is narrowed with thinner magnetic recording layer. This enhances the resolution which is an index indicative of the limit of the recording density of magnetic information recorded on the magnetic recording layer with respect to a fine regeneration. Consequently, the magnetic storage medium of the present invention as mentioned above is suitable for a medium for recording information at high recording density.

According to the magnetic storage medium of the present invention as mentioned above, the plurality of magnetic recording layers of ferromagnetism of the item (2) are in contact with the dividing layer of antiferromagnetism of the item (3). On the interface of the contact, the exchange interaction acts on between magnetization of the respective magnetic recording layers and magnetization of the dividing layer. The existence of the exchange interaction serves to apparently increase magnetic anisotropy energy $K_u$ of ferromagnetic crystal particles constituting the magnetic recording layer. Thus, the ferromagnetic crystal particles is stabilized in magnetization with respect to thermal fluctuation. Accordingly, magnetic information stored in the magnetic storage medium of the present invention may be stored therein stably for a long time.

In the magnetic storage medium of the present invention as mentioned above, it is preferable that said dividing layer consists of a material having a body-centered cubic structure, and each of said plurality of magnetic recording layers consists of a material having a hexagonal crystal structure and a uniaxial crystal magnetic anisotropy.

Generally, in many cases, the material having a hexagonal crystal structure has a uniaxial crystal magnetic anisotropy due to the symmetry of the crystal, and the material having the uniaxial crystal magnetic anisotropy offers a high orientation of magnetization. Further, generally, the material having a hexagonal crystal structure is easy to be subjected to a hetero-epitaxial growth on the material of the body-centered cubic structure rather than the material of the face-centered cubic structure. The hetero-epitaxial growth causes a high orientation of magnetization to be offered. Hence, the magnetic storage medium according to the above-mentioned preferable structure is excellent in orientation of magnetization. Further, an improvement of orientation of magnetization contributes to an increment of a coercive force $H_c$ and an improvement of the resolution. Thus, it is possible to obtain a magnetic storage medium which is large in coercive force $H_c$ and is high in resolution.

Further, in the magnetic storage medium of the present invention as mentioned above, it is preferable that said magnetic recording layer consists of a ferromagnetic alloy in which at least one element of Cr, Pt and Ta is added to Co.

Co is a ferromagnetic material having a hexagonal crystal structure and also having a uniaxial crystal magnetic anisotropy, and is suitable for a material of a magnetic storage medium. Adding Pt to Co enhances a coercive force $H_c$, and adding Cr or Ta to Co reduces a medium noise of the magnetic storage medium.

Furthermore, in the magnetic storage medium of the present invention as mentioned above, it is preferable that said dividing layer consists of an alloy in which at least one element of Mn, Ru and Re is added to Cr.

It is assumed that the magnetic storage medium, which is usually used, is used at temperature up to 60° C. or so. Also in the magnetic storage medium of the present invention, the dividing layer of the item (3) referenced above maintains the antiferromagnetism until at least the same temperature, and thus, as Néel temperature of the material constituting the dividing layer, 400 K is a standard.

As mentioned above, the feature that the dividing layer consists of an alloy in which at least one element of Mn, Ru and Re is added to Cr makes it possible, as will be described in the preferred embodiment of the present invention, to control Néel temperature of the material to be 400 K or more. Further, it is considered that a magnitude of the above-mentioned exchange interaction is varied in accordance with the control of Néel temperature, so that a stability of the magnetic storage medium of the present invention for the thermal fluctuation is increased.

Hereinafter, there will be explained a magnetic storage medium having a Cr system of dividing layer consisting of an alloy in which at least one element of Mn, Ru and Re is added to Cr.

In the magnetic storage medium having the above-mentioned Cr system of dividing layer, it is preferable that said dividing layer consists of an alloy in which Mn of concentration between 5 at % and 80 at % is added to Cr.

The alloy, in which Mn of concentration between 5 at % and 80 at % is added to Cr, is associated with Néel temperature 400 K or more, as will be described in the embodiment of the present invention, and is a material which chemically stably exists. Thus, such an alloy is suitable for the dividing layer.

In the magnetic storage medium having the above-mentioned Cr system of dividing layer, it is preferable that said dividing layer consists of an alloy in which Ru of concentration between 2 at % and 18 at % is added to Cr.

The alloy, in which Ru of concentration between 2 at % and 18 at % is added to Cr, is associated with Néel temperature 400 K or more, as will be described in the embodiment of the present invention. Thus, such an alloy is suitable for the dividing layer.

In the magnetic storage medium having the above-mentioned Cr system of dividing layer, it is preferable that said dividing layer consists of an alloy in which Re of concentration between 2 at % and 14 at % is added to Cr.

The alloy, in which Re of concentration between 2 at % and 14 at % is added to Cr, is associated with Néel temperature 400 K or more, as will be described in the embodiment of the present invention. Thus, such an alloy is suitable for the dividing layer.

In the magnetic storage medium having the above-mentioned Cr system of dividing layer, it is preferable that said dividing layer consists of an alloy in which at least one element of Mo and W is added to Cr.

In the magnetic storage medium having such preferred structures as mentioned above, an interval between (110) face and (110) face of the alloy in which at least one element of Mo and W is further added to Cr, which alloy constitutes the dividing layer, is controlled by an amount of added Mo and W. In the event that the plurality of magnetic recording layers of the item (2) consist of an alloy of which a main component is Co excellent as a ferromagnetic material, an interval between the above-mentioned face-to-face is controlled so as to substantially coincide with an interval between (002) face and (002) face of the alloy in which Co is a main component. This control contribute to acceleration of a hetero-epitaxial growth between the recording layers and the dividing layer. Consequently, the magnetic storage medium is favorable in orientation, large in coercive force $H_c$ and high in resolution.

In the magnetic storage medium having the above-mentioned Cr system of dividing layer, it is preferable that said dividing layer consists of an alloy in which at least one element of Pt and Rh is added.

Adding those elements to Cr makes it possible to increase a thermal stability of the magnetic storage medium as will be described in the embodiment of the present invention.

In the magnetic storage medium having the above-mentioned Cr system of dividing layer, it is preferable that said alloy has Néel temperature 400 K or more.

In an alloy constituting a dividing layer, also in the event that a plurality of elements are added to Cr, if an amount of addition of elements is controlled in such a manner that the alloy has Néel temperature 400 K or more, it is possible to provide a magnetic storage medium suitable for practice use.

Next, there will be explained a magnetic storage medium having a primary layer.

In the magnetic storage medium of the present invention as mentioned above, (4) it is preferable that the magnetic storage medium further comprises a primary layer composed of at least one of a non-magnetic layer consisting of a material having a body-centered cubic structure and an antiferromagnetic layer consisting of a material having a body-centered cubic structure, said primary layer being adjacent to said substrate, wherein a lowest stage of magnetic recording layer of said plurality of magnetic recording layers is formed adjacent to said primary layer.

The magnetic storage medium having a primary layer is excellent in orientation of magnetization since the magnetic recording layers of the item (2) are favorably subjected to the hetero-epitaxial growth on the primary layer. Further, in a case where the primary layer includes an antiferromagnetic layer, the antiferromagnetic layer is in contact with the lowest stage of magnetic recording layer of the plurality of magnetic recording layers. This feature makes it possible to hold magnetic information recorded on the magnetic storage medium of the present invention stably for a long time.

In the magnetic storage medium having the primary layer, it is preferable that said primary layer has said non-magnetic layer, and said non-magnetic layer includes Cr and consists of a material in which Mo or W is added to Cr.

The magnetic storage medium having the above-mentioned structure is favorable in orientation, large in coercive force $H_c$ and high in resolution by the same reason as a case where said dividing layer consists of an alloy in which at least one element of Mo and W is added to Cr.

In the magnetic storage medium having the primary layer, it is preferable that said primary layer has said antiferromagnetic layer, and said antiferromagnetic layer includes Cr and consists of an alloy in which at least one element of Mn, Ru and Re is added to Cr.

The magnetic storage medium having the above-mentioned structure is capable of controlling Néel temperature to be 400 K or more by the same reason as a case where said dividing layer consists of an alloy in which at least one element of Mn, Ru and Re is added to Cr. Further, it is possible to increase a stability as to a thermal fluctuation of the magnetic storage medium of the present invention.

Hereinafter, there will be described the primary layer having the antiferromagnetic layer which includes Cr and consists of an alloy in which at least one element of Mn, Ru and Re is added to Cr. The antiferromagnetic layer of the primary layer of the respective magnetic storage medium having the preferable structure, which will be described hereinafter, has the similar aspect to the above-mentioned dividing layer having the same structure as the antiferromagnetic layer.

In the magnetic storage medium as mentioned above, wherein said primary layer has said antiferromagnetic layer consisting of said alloy, it is preferable that said antiferromagnetic layer includes Cr and consists of an alloy in which Mn of concentration between 5 at % and 80 at % is added to Cr.

In the magnetic storage medium as mentioned above, wherein said primary layer has said antiferromagnetic layer consisting of said alloy, it is preferable that said antiferromagnetic layer includes Cr and consists of an alloy in which Ru of concentration between 2 at % and 18 at % is added to Cr.

In the magnetic storage medium as mentioned above, wherein said primary layer has said antiferromagnetic layer consisting of said alloy, it is preferable that said antiferromagnetic layer includes Cr and consists of an alloy in which Re of concentration between 2 at % and 14 at % is added to Cr.

In the magnetic storage medium as mentioned above, wherein said primary layer has said antiferromagnetic layer consisting of said alloy, it is preferable that said antiferromagnetic layer includes Cr and consists of an alloy in which at least one element of Mn, Ru and Re is added to Cr, and in addition at least one element of Mo and W is added.

In the magnetic storage medium as mentioned above, wherein said primary layer has said antiferromagnetic layer consisting of said alloy, it is preferable that said antiferromagnetic layer includes Cr and consists of an alloy in which at least one element of Mn, Ru and Re is added to Cr, and in addition at least one element of Pt and Rh is added.

In the magnetic storage medium as mentioned above, wherein said primary layer has said antiferromagnetic layer consisting of said alloy, it is preferable that said antiferromagnetic layer includes Cr and consists of an alloy in which at least one element of Mn, Ru and Re is added to Cr, said alloy having Néel temperature 400 K or more.

In the magnetic storage medium of the present invention as mentioned above, (5) it is preferable that the magnetic storage medium further comprises a protective layer including a carbon, said protective layer being formed adjacent to a top layer of said magnetic recording layers.

In the case of this magnetic storage medium, since the protective layer of the item (5) consists of hard particles, the magnetic recording layers of the item (2) are protected by the protective layer.

In the magnetic storage medium of the present invention as mentioned above, it is preferable that said magnetic recording layers are associated with a product Br·t between 20 Gauss·$\mu$m and 100 Gauss·$\mu$m where Br denotes a residual flux density of the magnetic recording layers and t denotes a sum total of thickness of the magnetic recording layers.

In the magnetic storage medium which is usually used, the value of Br·t is 100 Gauss·$\mu$m or so. Thus, in order to improve a resolution of the magnetic storage medium, it is preferable that a sum total of thickness of the magnetic recording layers is reduced so that the value of Br·t is not more than 100 Gauss·$\mu$m. On the other hand, in the magnetic storage medium wherein the value of Br·t is not more than 20 Gauss·$\mu$m, it is difficult to obtain a sufficient regeneration output with the use of a head which is usually used. For this reason, it is preferable that the value of Br·t is not less than 20 Gauss·$\mu$m.

In the magnetic storage medium of the present invention as mentioned above wherein each of the plurality of magnetic recording layers consists of a material having a uniaxial crystal magnetic anisotropy, it is preferable that said substrate is a disk-like shaped substrate, and said magnetic recording layers are associated with one in which a direction of a uniaxial crystal magnetic anisotropy of a material constituting each of said magnetic recording layers is substantially coincident with a circumferential direction of the disk-like shaped substrate.

Generally, a magnetic storage medium is of a disk type, and a direction of a magnetic field of a head for recording magnetic information on the magnetic storage medium or regeneration of the magnetic information is substantially coincident with a circumferential direction of the disk-like shaped magnetic storage medium. As will be described in the preferred embodiment of the present invention, magnetic information of the magnetic storage medium is held more stably on a thermal basis with greater magnetic anisotropy in a circumferential direction of the disk-like shaped magnetic storage medium.

DETAILED DESCRIPTION OF PREFERRED EMBODIMENTS

Hereinafter, there will be described a magnetic storage medium according to an embodiment of the present invention in conjunction with FIGS. 1 and 2.

Figure 1:
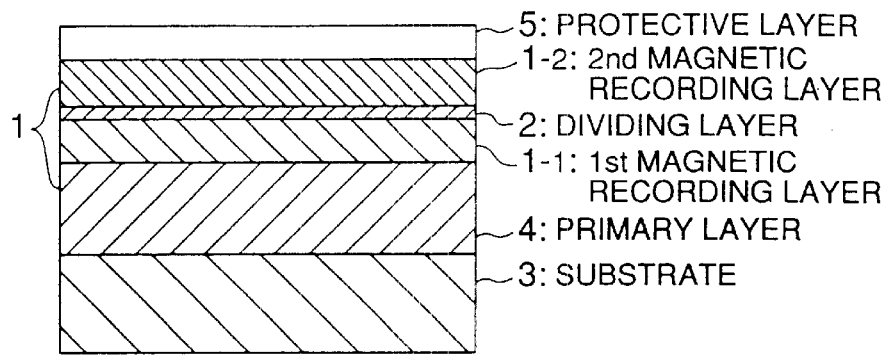
FIG. 1 is a sectional view showing a sectional structure of a magnetic storage medium according to an embodiment of the present invention.

FIG. 1 is a sectional view showing a sectional structure of a magnetic storage medium according to an embodiment of the present invention.

A magnetic storage medium m2 comprises a magnetic recording layer 1 for carrying magnetic information, a dividing layer 2 for dividing the magnetic recording layer 1 into a first magnetic recording layer 1_1 and a second magnetic recording layer 1_2, a substrate 3 for supporting the magnetic recording layer 1 and the dividing layer 2, a primary layer 4 intervening between the substrate 3 and the first magnetic recording layer 1_1, and a protective layer 5 for protecting the magnetic recording layer 1.

The substrate 3 is an Al/NiP disk substrate which has undergone a texture processing in which a NiP disk substrate is coated with aluminum. The substrate 3 corresponds to the non-magnetic substrate referred to in the present invention. The primary layer 4 is formed adjacent to the substrate 3. The primary layer 4 consists of $CrMo_{10}$ and has a thickness of 30 nm. On the top of the primary layer 4, there is formed the first magnetic recording layer 1_1. It is noted that composition of substance is represented by a t %.

The first magnetic recording layer 1_1 is completely same as the second magnetic recording layer 1_2 in thickness of the layer and material, but different only in location. Those layers are thin, such as 10 nm, and consist of polycrystal material of CoCrPtTa alloy ($Co_{68}$ $Cr_{20}$ $Pt_{10}$ $Ta_2$) having a hexagonal structure offering a ferromagnetism. The magnetization of the respective crystal particles has a uniaxial crystal anisotropy in (001) direction of the crystal. The respective crystal particles are formed in such a manner that a direction of the uniaxial crystal anisotropy is substantially coincident with a circumferential direction of the above-mentioned disk-like shaped substrate 3. The CoCrPtTa alloy offering a ferromagnetism has, as mentioned above, a uniaxial crystal anisotropy, and therefore, it is excellent in orientation of magnetization-and also high in coercive force $H_c$. Thus, the CoCrPtTa alloy is high in resolution, and is suitable for a material of a magnetic storage medium on which magnetic information is recorded at high density.

On the top of the first magnetic recording layer 1_1, the dividing layer 2 is formed on a adjacent basis. The second magnetic recording layer 1_2 is formed in adjacent to the top of the dividing layer 2. The dividing layer 2 has a thickness of 5 nm and consists of $CrMn_{30}$ which is an antiferromagnetic material having a body-centered cubic structure. The antiferromagnetic material $CrMn_{30}$ has a high Néel temperature about 800 K. According to the present embodiment, as a material of the dividing layer 2, there is adopted the antiferromagnetic material such as $CrMn_{30}$, but not a non-magnetic material such as Cr simply. Therefore, magnetization of an interface with the first magnetic recording layer 1_1 or the second magnetic recording layer 1_2 interacts with magnetization of an interface of the adjacent dividing layer 2 interposed the former interface.

As to the dividing layer 2 and the primary layer 4, there is adopted a material of an alloy of Cr as a main component. Generally, for the primary layer, the use of the material of body-centered cubic structure rather than the material of face-centered cubic structure is excellent in orientation of magnetization of the magnetic recording layer formed adjacent to the primary layer. This is the similar as to the dividing layer. There will be described the crystal structure of those layers referring to FIG. 2 hereinafter.

Figure 2:
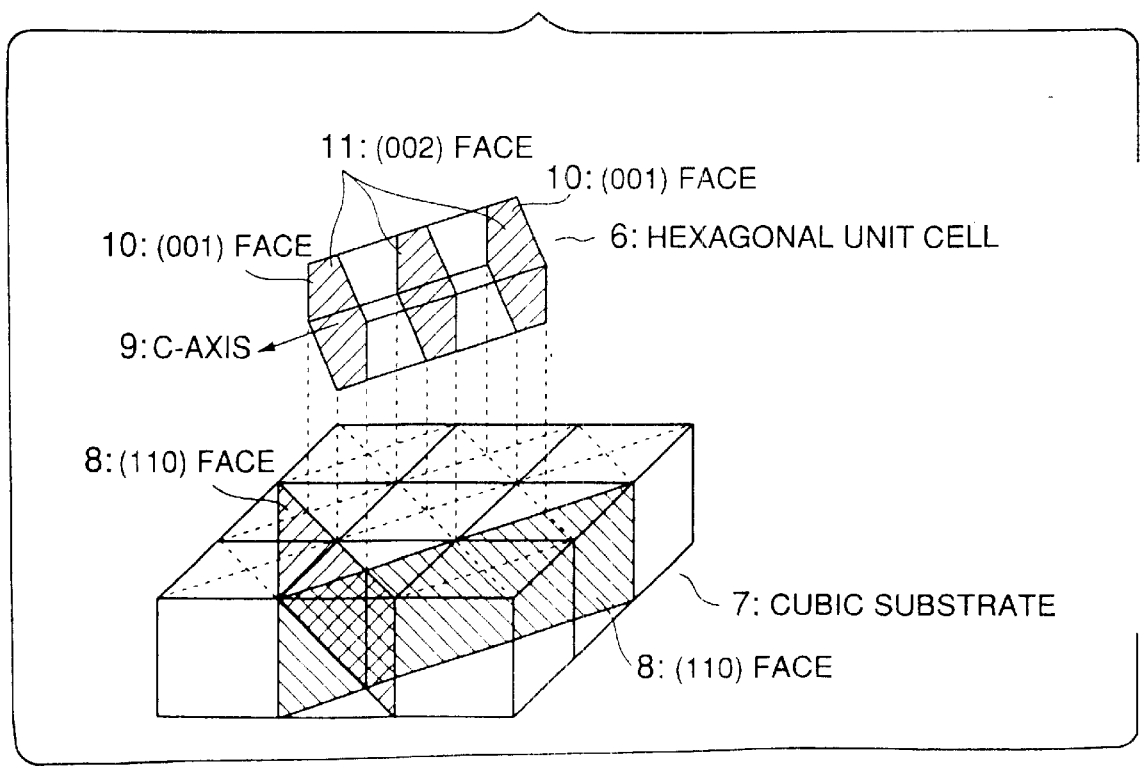
FIG. 2 is an illustration showing a crystal structure of material constituting a dividing layer and material constituting magnetic recording layers.

FIG. 2 is an illustration showing a crystal structure of material constituting a dividing layer and material constituting magnetic recording layers.

In FIG. 2, at the upper portion, there is shown a hexagonal unit cell 6 of the CoCrPtTa alloy constituting the first magnetic recording layer 1_1. At the lower portion of FIG. 2, there is shown a cubic substrate 7 consisting of $CrMo_{10}$ of the body-centered cubic structure constituting the primary layer 4. Here, as the crystal structure of the cubic substrate 7, there is extracted a representative of a unit cell of the body-centered cubic structure from the an interface of the primary layer 4 adjacent to the first magnetic recording layer 1_1. The cube is composed of 3×3 pieces formed on a plane of the layer. Faces, which extend in a diagonal direction with respect to the upper surface of the cube and extend perpendicularly with respect to a plane of the layer, represent (110) face 8 of the crystal structure.

The hexagonal unit cell 6 has a hexagonal column of configuration. An axis perpendicular to both the bottoms of the hexagonal column represents a c-axis 9 which is oriented in an in-plane direction of the layer and in a direction of a one diagonal line on the upper surface of the cube appearing on the cubic substrate 7. The crystal of the CoCrPtTa alloy has a uniaxial crystal anisotropy with respect to a direction of the c-axis 9.

Both the bottom surfaces of the hexagonal column represents (001) face 10 of the hexagonal structure. (002) face 11 denotes a face having a face interval half of a face interval of the (001) face 10. The (002) faces 11 are represented by both the bottom surfaces and a surface which is parallel to both the bottom surfaces and is located at the intermediate point between both the bottom surfaces. Those (002) faces 11 are parallel to (110) face of the cubic substrate 7. The face interval of the (002) faces 11 is substantially coincident with tat of the cubic substrate 7. Thus, the CoCrPtTa alloy of the hexagonal structure is subjected to a hetero-epitaxial growth on the interface of the upper portion of the primary layer 4 consisting of $CrMo_{10}$ of the body-centered cubic structure. As mentioned above, the c-axis 9 is oriented to the in-plane direction. This is owing to the hetero-epitaxial growth of the CoCrPtTa alloy of the hexagonal structure. This makes it possible that magnetization of the first magnetic recording layer 1_1 is oriented in an in-plane direction of the layer.

Further, in a similar fashion to the matter that the first magnetic recording layer 1_1 is subjected to a hetero-epitaxial growth on the interface of the upper portion of the primary layer 4, the dividing layer 2 consisting of $CrMo_{30}$ and the second magnetic recording layer 1_2 consisting of the CoCrPtTa alloy are subjected to a hetero-epitaxial growth on the first magnetic recording layer 1_1 and the dividing layer 2, respectively. This makes it possible that magnetization of the second magnetic recording layer 1_2 is well oriented in an in-plane direction of the layer. In this manner, magnetization of both the layers of the magnetic recording layer 1 is oriented in an in-plane direction of the layer, so that the coercive force $H_c$ of the magnetic recording layer 1 is enhanced. Since the coercive force $H_c$ is enhanced and the respective layers of the magnetic recording layer 1 are thin, the magnetic storage medium m2 according to the present embodiment has high resolution.

Incidentally, it is acceptable that the alloy, of which main component is Cr, constituting the dividing layer 2 and the primary layer 4 additionally includes elements of one or more types of Mo and W. The addition of those elements serves to control the face interval of the (110) of the alloy. The control of the face interval of the (110) of the alloy makes it possible to provide a favorable epitaxial growth on interfaces between the dividing layer 2 and the primary layer 4 and the magnetic recording layer 1, so that coercive force $H_c$ of the magnetic recording layer 1 is enhanced.

In order to protect the above-mentioned respective layers, there is formed a protective layer 5 adjacent to the upper portion of the second magnetic recording layer 1_2. The protective layer 5 is composed of an assembly of hard particles consisting of a carbon having a thickness of 8 nm. The protective layer 5 prevents damage of the respective layers such as the magnetic recording layer 1 and so on, which damage may occur when a floating head for reading magnetic information recorded on both the magnetic recording layers is in contact with the magnetic storage medium.

The magnetic storage medium m2 having the above-mentioned structure was fabricated in accordance with a DC magnetron spattering process. In the fabrication of the magnetic storage medium m2, the Al/NiP disk substrate, which was well washed, was prepared. After a film fabrication chamber was evacuated less than $1.0 \times 10^{-7}$ Torr in degree of vacuum, Ar gas was supplied to keep 5 m Torr. The substrate was heated to 220° C. and the film fabrication for the above-mentioned respective layers was sequentially processed on a non-bias basis.

The magnetic storage medium m2 according to the present embodiment, which is characterized in that it is enhanced in coercive force $H_c$ and resolution, and the magnetic recording layer 1 is divided by the dividing layer 2 composed of the antiferromagnetic material, is stable in storage of magnetic information recorded in magnetic recording layer 1 on a thermal basis. This will be explained hereinafter. Table 1 shows measurement results of a stability to thermal fluctuation of the magnetic information, and measurement results of $S/N_m$ when the magnetic information is regenerated. Table 1 also shows, as a comparative object, results as to the conventional magnetic storage medium m1 in which the magnetic storage medium m2 is changed in such a way that only the dividing layer 2 is replaced by a layer having the same thickness as the dividing layer 2 and consisting of a non-magnetic material Cr. The magnetic storage medium m1 was fabricated under the same fabrication condition as that of the magnetic storage medium m2, but the point that the material of the dividing layer is Cr, and in accordance with the same procedure as that of the magnetic storage medium m2.

TABLE 1

| Medium | $T_{90}$ ($H_r = 0$ O e) | $T_{90}$ ($H_r = 400$ O e) | $S_{iso}/N_m$ |
|---|---|---|---|
| m1 | $8.0 \times 10^{11}$ years | ~1 year | 30.1 dB |
| m2 | $8.4 \times 10^{14}$ years | ~$2 \times 10^2$ years | 30.2 dB |

The left column of Table 1 represents, as measuring objects, the conventional magnetic storage medium m1 and the magnetic storage medium m2 according to the present embodiment. Thickness of the first magnetic recording layer 1_1 and thickness of the second magnetic recording layer 1_2 of both the media m1 and m2 are the same as one another. In both the media m1 and m2, Br·t of the magnetic recording layer 1 is 70 Gauss·$\mu$m. $T_{90}$ denotes a time in which the magnification of residual magnetization $M_r$ of the medium is reduced to 90% of the magnification of the initial magnetization of the measurement at 300 K, and is representative of life of magnetization of the medium and magnetic information recorded on the medium.

Changes with time of residual magnetization M, of both the media m1 and m2 were measured by an SQUID (Superconductive Quantum Interference Device) with respect to the case of no reverse-application magnetic field $H_r$ to be applied in a reverse direction to magnetization as to recording on the magnetic recording layer 1 and the case of 400 Oe. Times $T_{90}$ of both the media m1 and m2 were determined in accordance with changes with time of the measured residual magnetization $M_r$. $S_{iso}/N_m$ in Table 1 denotes a ratio of an output signal intensity $S_{iso}$ involved in regeneration of magnetic information in the state of a solitary wave having a low track recording density near 0 kFCI and medium noise $N_m$ involved in regeneration of magnetic information recorded at the track recording density of 160 kFCI. Numerical values in six columns encircled with the top columns and the left columns denote measured values.

As to $T_{90}$, in case of no reverse-application magnetic field ($H_r$=0Oe), $T_{90}$ of the magnetic storage medium m1 divided by the non-magnetic Cr is $8.0 \times 10^{11}$ years. On the other hand, $T_{90}$ of the magnetic storage medium m2 according to the present embodiment divided by the antiferromagnetic alloy is $8.4 \times 10^{14}$ years. This is longer about 1000 times as compared with $T_{90}$ of the magnetic storage medium m1. Also in case of an application of the reverse-application magnetic field ($H_r$=400 Oe), $T_{90}$ of the magnetic storage medium m2 is longer than $T_{90}$ of the magnetic storage medium m1. $T_{90}$ of the magnetic storage medium m1 is 1 year or so. On the other hand, $T_{90}$ of the magnetic storage medium m2 is $2 \times 10^2$ years which is about 200 times as compared with $T_{90}$ of the magnetic storage medium m1.

The reason why this is so is as follows. In the magnetic storage medium m2 according to the present embodiment divided by the antiferromagnetic alloy, the exchange interaction acts on between magnetization of the respective magnetic recording layers offering ferromagnetism and magnetization of an interface of the adjacent dividing layer 2 of antiferromagnetism. As a result, magnetic anisotropy energy $K_u$ of ferromagnetic crystal particles constituting the magnetic recording layer 1 is apparently increased. Thus, the ferromagnetic crystal particles is stabilized in a direction of magnetization.

The conventional magnetic storage medium m1 and the magnetic storage medium m2 according to the present embodiment showed high $S_{iso}/N_m$ of 30.1 db and 30.2 db, respectively. Thus, also in case of the use of antiferromagnetic alloy as a material of the dividing layer of the magnetic storage medium, $S_{iso}/N_m$ of the magnetic storage medium is maintained at high value.

Incidentally, in the magnetic storage medium m2 according to the present embodiment, Br·t is 70 Gauss·μm or so. In order to obtain high resolution, however, it is preferable that the value of Br·t is less than 100 Gauss·μm near the value of Br·t of the magnetic storage medium which is generally used. Further, in the magnetic storage medium wherein the value of Br·t is less than 20 Gauss·μm, it is difficult to obtain a sufficient regeneration output even with the use of the head which is generally used, and thus it is preferable that the value of Br·t is not less than 20 Gauss·μm.

As described above, the magnetic storage medium m2 according to the present embodiment having the dividing layer 2 consisting of the antiferromagnetic material offers high $S_{iso}/N_m$ which is the same order as that of the conventional magnetic storage medium m1 having the dividing layer consisting of the non-magnetic Cr, while magnetic information stored in the magnetic storage medium m2 has a stability as to a thermal fluctuation, which stability is remarkably higher than magnetic information stored in the conventional magnetic storage medium m1.

While the magnetic storage medium m2 according to the present embodiment adopts $CrMn_{30}$ as the dividing layer 2, it is acceptable that the materials other than $CrMn_{30}$ are adopted for the dividing layer 2. In order that such materials are adopted for the dividing layer 2, it is necessary that such materials serve as the dividing layer 2 at the temperature not less than 60° C. or so wherein the conventional magnetic storage medium is ensured in connection with the recording regeneration and the storage. For this reason, it is preferable that such materials have the Néel temperature not less than 400 K (about 130° C. taking a suitable margin.

Hereinafter, there will be explained composition of three types of alloys as a candidate for the dividing layer 2, and the Néel temperature of those alloys in conjunction with FIG. 3.

Figure 3:
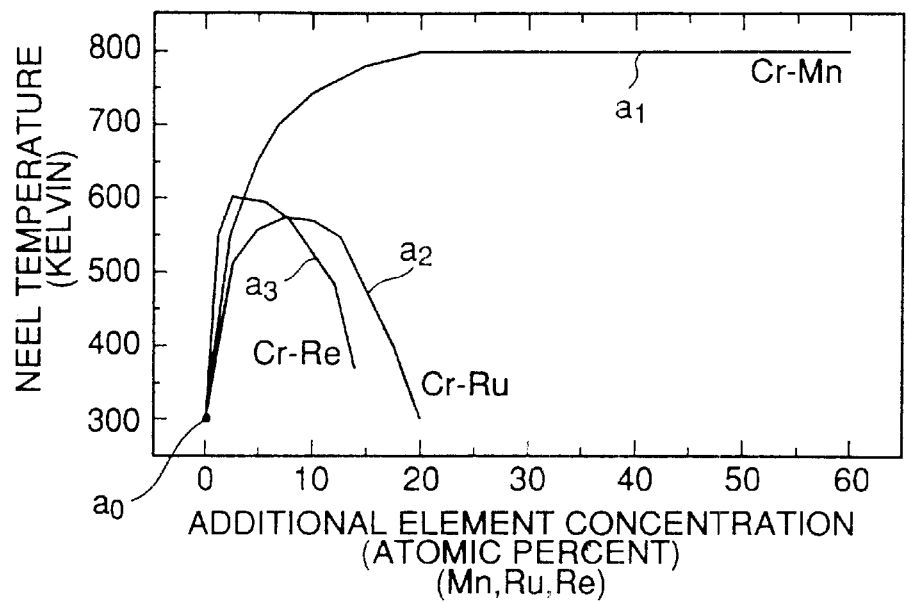
FIG. 3 is a graph showing changes of Néel temperature of alloys to the additional element concentration wherein elements of Mn, Ru and Re are added to Cr, respectively to form the associated alloy.

FIG. 3 is a graph showing changes of Néel temperature of alloys to the additional element concentration wherein elements of Mn, Ru and Re are added to Cr, respectively to form the associated alloy.

The axis of abscissas denotes in form of at % the additional concentration of Mn in the CrMn alloy, the additional concentration of Ru in the CrRu alloy, and the additional concentration of Re in the CrRe alloy. The axis of ordinates denotes in unit of K the Néel temperature of those alloys of CrMn alloy, CrRu alloy and CrRe alloy.

In the event that the additional concentration is zero, those alloys correspond to Cr of an element. In this case, as shown at the point a0 in the figure, the Néel temperature is 300 K which is substantially equal to the room temperature. Thus, it does not happen that Cr stably offers antiferromagnetism at the room temperature. Even if Cr offers antiferromagnetism, as will be considered from the low Néel temperature, a magnitude of the exchange interaction between magnetization-to-magnetization is small. As a result, Cr does not contribute, as a material of the dividing layer 2, to magnetization of the magnetic recording layer 1 and extending life of magnetic information recorded on the magnetic recording layer 1.

A solid line a1 shows a state that the Néel temperature of the CrMn alloy varies with respect to the additional concentration of Mn. As shown by the solid line a1, the Néel temperature of the CrMn alloy monotonously increases as the additional concentration of Mn increases from 0 at % to 20 at %, and saturates at high temperature such as 800 K in the additional concentration of 20 at % or so. A solid line a2 shows a state that the Néel temperature of the CrRu alloy varies with respect to the additional concentration of Ru. As shown by the solid line a2, the Néel temperature of the CrRu alloy monotonously increases as the additional concentration of Ru increases from 0 at % to 8 at %, and has a peak near 8 at % exceeding 500 K. And thereafter, as the additional concentration of Ru increases more than 8 at % or so, the Néel temperature of the CrRu alloy gradually decreases. A solid line a3 shows a state that the Néel temperature of the CrRe alloy varies with respect to the additional concentration of Re. As shown by the solid line a3, the Néel temperature of the CrRe alloy monotonously increases as the additional concentration of Re increases from 0 at % to 3 at %, and has a peak near 3 at % reaching 600 K. And thereafter, as the additional concentration of Re increases more than 3 at % or so, the Néel temperature of the CrRe alloy gradually decreases.

As mentioned above, as far as Mn, Ru or Re is concerned, application of any of those elements into Cr several at % may improve the Néel temperature over 200 K. In order that each of the CrMn alloy, the CrRu alloy and the CrRe alloy has the Néel temperature of 400 K or more, any one is acceptable, as those alloy, which has the additional concentration of Mn not less than 5 at %, the additional concentration of Ru between 2 at % and 18 at %, or the additional concentration of Re between 2 at % and 14 at %. Incidentally, it is preferable that the additional concentration of Mn of the CrMn alloy is limited to 80 at % in which the CrMn alloy is formed stably as an alloy of the body-centered cubic structure in accordance with a sputtering process. It is acceptable that the dividing layer of the magnetic storage medium according to the present invention is any one of the CrMn alloy, the CrRu alloy and the CrRe alloy each having the additional concentration within the associated range, other than $CrMn_{30}$ of the material constituting the dividing layer 2 of the above-mentioned magnetic storage medium m2 according to the present embodiment. As to data of the graph of FIG. 3, "Magnetic Substance Handbook" (Satonobu Tikakado, et al. 1975, Asakura Syoten).

As mentioned above, in the magnetic storage medium m2 according to the present embodiment, $S_{iso}/N_m$ in regeneration of magnetic information recorded on the magnetic storage medium is large and the magnetic information is stable with respect to the thermal fluctuation. Change of part of the structure of the magnetic storage medium m2 makes it possible that magnetic information recorded on the magnetic storage medium is further stable with respect to the thermal fluctuation. Hereinafter, there will be described several structures contributing to further stabilization for magnetic information with respect to the thermal fluctuation.

First, as the material of the primary layer 4, the non-magnetic $CrMo_{10}$ is replaced by the antiferromagnetic material. This makes it possible that magnetic information recorded on the magnetic storage medium is further stable with respect to the thermal fluctuation.

Table 2 shows measurement results of $T_{90}$ when no reverse-application magnetic field $H_r$ is applied at the temperature 300 K.

TABLE 2

| Media | $T_{90}$ ($H_r$ = 0Oe) |
|---|---|
| m3 | $\sim 10^{19}$ |
| m4 | $\sim 10^{29}$ |
| m5 | $\sim 10^{36}$ |

The left column of Table 2 shows a type of the measured media. One of those media is the medium m3 comprising: an Al/NiP disk substrate subjected to a texture process; a primary layer formed adjacent to the substrate, the primary layer consisting of a non-magnetic material $CrMo_{10}$ and having a thickness of 25 nm; a magnetic recording layer formed on the top of the primary layer, the magnetic recording layer consisting of a material of $Co_{72} Cr_{19} Pt_5 Ta_2 Nb_2$ and having a thickness of 25 nm; and a protective layer formed on the top of the magnetic recording layer, protective layer consisting of a carbon and having a thickness of 8 nm. With respect to the remaining two media, those media are the medium m4 and medium m5. The medium m4 is equivalent to a modification of the medium m3 in which the primary layer consisting of the non-magnetic material $CrMo_{10}$ is replaced by a primary layer consisting of an antiferromagnetic material $CrMn_{40}$, retaining a thickness of 25 nm. The medium m5 is equivalent to a modification of the medium m3 in which the primary layer consisting of the non-magnetic material $CrMo_{10}$ is replaced by a primary layer consisting of an antiferromagnetic material $CrMn_{40}Pt_5$, retaining a thickness of 25 nm. Those media were fabricated, in a similar fashion to that of the above-mentioned magnetic storage medium m2 according to the present embodiment, in such a manner that a film fabrication of the respective layers of those media is advanced on a non-bias basis in accordance with a DC magnetron spattering process under the condition of a gas partial pressure in a film fabrication chamber and a temperature of the substrate, which is same as the fabrication condition of the magnetic storage medium m2.

The right column of Table 2 shows $T_{90}$ associated with the respective media of the left column. Those times $T_{90}$ were obtained in such a manner that changes with time of residual magnetization $M_r$ of those media are measured by an SQUID (Super-conductive Quantum Interference Device) in conditions of no reverse-application magnetic field $H_r$, and the temperature of 300 K.

In case of the magnetic storage medium m3 having the primary layer consisting of a non-magnetic material $CrMo_{10}$, $T_{90}$ is about $10^{19}$. On the other hand, in case of the magnetic storage medium m4 having the primary layer consisting of an antiferromagnetic material $CrMn_{40}$, $T_{90}$ is about $10^{29}$ which is $10^{10}$ times of that of the medium m3. The reason why it is so is considered, in a similar fashion to that of the use of the antiferromagnetic material for the dividing layer, that the exchange interaction acts on between magnetization of the magnetic recording layer offering ferromagnetism and magnetization of an interface of the adjacent layer of antiferromagnetism.

In case of the magnetic storage medium m5 having the primary layer consisting of an antiferromagnetic material $CrMn_{40}Pt_5$, $T_{90}$ is about $10^{36}$ which is $10^7$ times of that of the medium m4. The reason why it is so is considered that Pt element solid-solute in the lattice of the CrMn alloy is polarized owing to the internal magnetic field. However, the detailed mechanism is not yet clarified. The polarization is known also in Ru element and Rh element. Addition of anyone of Ru element and Rh element makes it possible to expect an increment of $T_{90}$. Further, also with respect to alloys of which the main component is Cr, other than the CrMn alloy, it is considered that addition of anyone of Pt element, Ru element and Rh element makes it possible to expect an increment of $T_{90}$.

As described above, in the magnetic storage medium m2 according to the present embodiment having the antiferromagnetic dividing layer, when the primary layer 4 consisting of the non-magnetic material $CrMo_{10}$ is replaced by a primary layer of antiferromagnetism, magnetization of the magnetic recording layer 1 has an effect on the exchange interaction between it and the primary layer as well as the exchange interaction between it and the dividing layer 2. Thus, it is considered that the magnetic storage medium, in which the primary layer is replaced, is a medium wherein $T_{90}$ is longer than the magnetic storage medium m2 and magnetic information is stored more stably on a thermal basis.

It is preferable that the material of the primary layer of antiferromagnetism has, similar to the material of the dividing layer 2, Néel temperature 400 K or more. specifically, there are given, as the candidate, the CrMn alloy having the additional concentration of Mn between 5 at % and 80 at %, the CrRu alloy having the additional concentration of Ru between 2 at % and 18 at %, and the CrRe alloy having the additional concentration of Re between 2 at % and 14 at %. It is acceptable that one or more sorts of element of Mo and W is further added to those materials of the primary layer. Such an addition of the element serves to control a face interval of (110) of the alloy to be the material. Further, it is acceptable that Pt is further added to those materials of the primary layer. It is considered that such an addition of Pt causes, as explained in connection with Table 2, the medium including such a primary layer to be extended in $T_{90}$, so that magnetic information may be stored therein stably for a long time. Alternatively, it is acceptable that Pt is added to the dividing layer 2. In this case, it is considered that such an addition of Pt causes the medium including such a dividing layer to be extended in $T_{90}$, so that magnetic information may be stored therein stably for a long time.

The magnetic storage medium having the primary layer consisting of the antiferromagnetic material as mentioned above is associated with a long $T_{90}$. Accordingly, the antiferromagnetic material is excellent as a material of the primary layer. However, in some cases, with respect to the crystallinity, the non-magnetic material is more excellent than the antiferromagnetic material. In such a case, the primary layer is arranged with two layers in such a manner that as a sub-primary layer of the primary layer of the antiferromagnetic material, a primary layer consisting of the non-magnetic material having the same body-centered cubic structure is prepared. This arrangement of the primary layer having the two layers improves the crystallinity of the antiferromagnetic material to accelerate the hetero-epitaxial growth on the layer consisting of the antiferromagnetic material and the magnetic recording layer, and thereby improving the coercive force $H_c$ of magnetic storage medium. As the material of the above-mentioned non-magnetic primary layer, Cr-system of alloy of the body-centered cubic structure is suitable.

Next, there will be described a matter that a stability of magnetic information stored in the magnetic storage medium m2 to the thermal fluctuation is increased through enhancing magnetic anisotropy of the magnetic recording layer 1.

Figure 4:
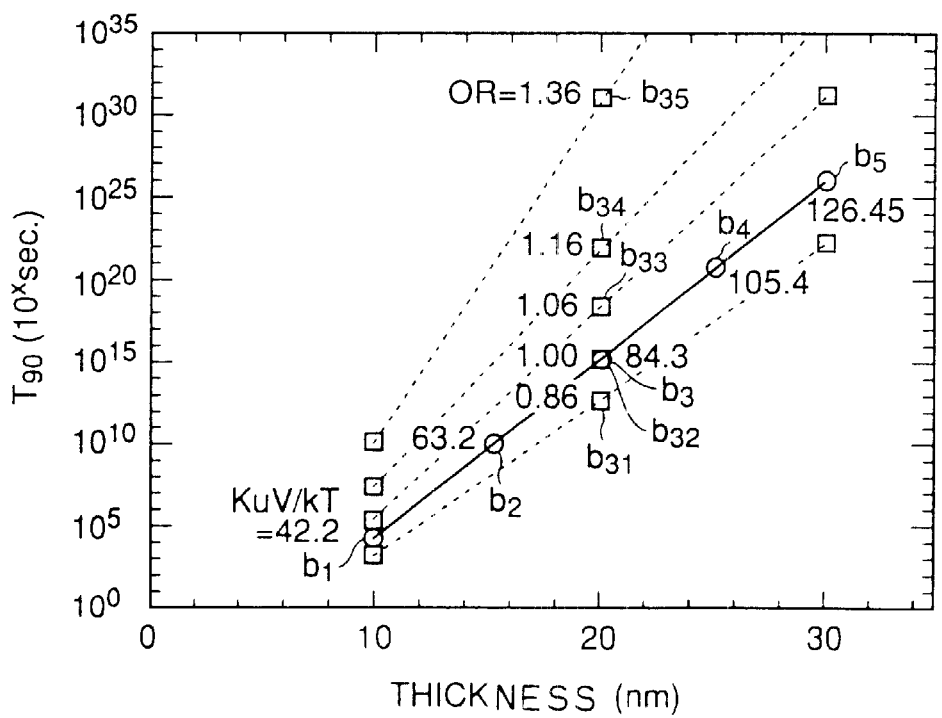
FIG. 4 is a graph showing a simulation result of changes of $T_{90}$ to an orientation ratio (OR) of magnetization of a magnetic recording layer.

FIG. 4 is a graph showing a simulation result of changes of $T_{90}$ to an orientation ratio (OR) of magnetization of a magnetic recording layer.

This simulation is a micro magnetic simulation using the Monte Carlo method in combination. In accordance with this simulation, the state of thermal mitigation of magnification in one bit domain of a single layer of magnetic recording layer were examined on the basis of anisotropy energy, Zeeman energy, magnetostatic energy, and energy due to the exchange interaction in various orientations of the respective magnetization of each ferromagnetic crystal particle in the domain, and magnetization $T_{90}$ in the one bit domain was calculated.

The orientation ratio (OR) is given by $H_{cc}/H_{cr}$ where $H_{cc}$ represents a coercive force obtained through a measurement in such a way that a magnetic field is applied in a head running direction or generally in a circumferential direction of a disk substrate, and $H_{cr}$ represents a coercive force obtained through a measurement in such a way that a magnetic field is applied in a radial direction. The OR is often adopted as a criterion for evaluation of the magnetic anisotropy.

The axis of abscissas of the graph shown in FIG. 4 represents the thickness of a magnetic recording layer in unit of nm. According to this simulation, the thickness of a magnetic recording layer corresponds to a height of each ferromagnetic crystal particle. The axis of ordinates of the graph shown in FIG. 4 represents $T_{90}$ of magnetization of a magnetic recording layer at the logarithmic scale. As shown by a circle mark b1, in case of OR=1.0, $T_{90}$ of magnetization of a magnetic recording layer having the thickness 10 nm was $10^4$ second. Incidentally, in connection with this magnetic recording layer having the thickness 10 nm; the value of $(K_u V)/(k_B T)$ was 42.2. In this graph of FIG. 4, the value of $K_u/(k_B T)$ is always constant, and an area of the layer face of each ferromagnetic crystal particle is always constant. Thus, the value of $(K_u V)/(k_B T)$ is in proportion to the thickness represented by the axis of abscissas.

The solid line passing through the circle mark b1 indicates that OR of magnetization of the magnetic recording layer is 1.0. As shown by circle marks b2, b3, b4 and b5, when the thickness of the magnetic recording layer was given with 15 nm, 20 nm, 25 nm and 30 nm, respectively, the values of $(K_u V)/(k_B T)$ of the ferromagnetic crystal particles of the magnetic recording layer with their associated thickness were 63.2, 84.3, 105.4, and 126.45, respectively. And $T_{90}$ of magnetization of the magnetic recording layer having the ferromagnetic crystal particles having the above-referenced values were about $10^{10}$ sec., $10^{15}$ sec., $10^{20}$ sec., and $10^{26}$ sec., respectively. As described above, in the event that OR of magnetization of the magnetic recording layer is constant, as the value of $(K_u V)/(k_B T)$ of the ferromagnetic crystal particle of the magnetic recording layer is increased, $T_{90}$ of magnetization of the magnetic recording layer is increased on an exponential function basis.

Next, in order to changes of $T_{90}$ according to changes of the OR, let us notice a case where the thickness of the magnetic recording layer is 20 nm. In this case, the value of $(K_u V)/(k_B T)$ was 84.3 and constant, and Br·t was 80 Gauss·$\mu$m or so. In a case where the thickness of the magnetic recording layer is 20 nm, as shown by square marks b31, b32, b33, b34 and b35, when OR of magnetization of the magnetic recording layer was given with 0.86, 1.00, 1.06, 1.16, 1.36, respectively, $T_{90}$ of magnetization of the magnetic recording layer having the ferromagnetic crystal particles having the above-referenced values were about $10^{13}$ sec., $10^{15}$ sec., $10^{18}$ sec., $10^{22}$ sec., and $10^{31}$ sec., respectively.

As described above, in the medium wherein Br·t is 80 Gauss·$\mu$m or so, as OR, which may be an index of magnetic anisotropy of magnetization of the magnetic recording layer, is improved by 0.1, $T_{90}$ of magnetization of the magnetic recording layer is greatly improved as $10^4$~$10^5$ times. The broken lines, which pass through square marks b31~b35, respectively, represent the states of changes of $T_{90}$ in the event that the thickness of the magnetic recording layer having the same OR as those of the square marks b31~b35 is varied. It would be understood that $T_{90}$ is greatly improved together with an improvement of OR regardless of the thickness.

Through the simulation result, it has been confirmed that as the magnetic anisotropy of a magnetic storage medium in a circumferential direction of a disk, which is represented by a magnitude of OR, is large, magnetic information of the magnetic storage medium is held more stably for a long time, which is represented by $T_{90}$.

As mentioned above, according to the present invention, it is possible to provide a magnetic storage medium capable of recording information at high recording density and also to regenerating the information with a high quality of signal (high $S/N_m$), and in addition contributing to the elongation of a life span of the recorded information by increasing a stability to thermal fluctuation of the information.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A magnetic storage medium comprising:
   a non-magnetic substrate;
   a plurality of magnetic recording layers of ferromagnetism, wherein the magnetization of each of said magnetic recording layers is oriented in an in-plane direction; and
   a dividing layer of antiferromagnetism for dividing said plurality of magnetic recording layers from one another through intervening between the magnetic recording layer-to layer;
   wherein said dividing layer consists of an alloy in which at least one element of Mn, Ru and Re is added to Cr, said alloy having a Néel temperature of 400 K or more.

2. A magnetic storage medium according to claim 1, wherein said dividing layer consists of a material having a body-centered cubic structure, and each of said plurality of magnetic recording layers consists of a material having a hexagonal crystal structure and a uniaxial crystal magnetic anisotropy.

3. A magnetic storage medium according to claim 1, wherein each of said magnetic recording layers consists of a ferromagnetic alloy in which at least one element of Cr, Pt and Ta is added to Co.

4. A magnetic storage medium according to claim 1, wherein said dividing layer consists of an alloy in which Mn of concentration between 5 at % and 80 at % is added to Cr.

5. A magnetic storage medium according to claim 1, wherein said dividing layer consists of an alloy in which Ru of concentration between 2 at % and 18 at % is added to Cr.

6. A magnetic storage medium according to claim 1, wherein said dividing layer consists of an alloy in which Re of concentration between 2 at % and 14 at % is added to Cr.

7. A magnetic storage medium comprising:
   a non-magnetic substrate;
   a plurality of magnetic recording layers of ferromagnetism; and a dividing layer of antiferromagnetism for dividing said plurality of magnetic recording layers from one another through intervening between the magnetic recording layer-to layer;

wherein said dividing layer consists of an alloy in which at least one element of Mn, Ru and Re is added to Cr, and in addition at least one element of Mo and W is added.

8. A magnetic storage medium comprising:

a non-magnetic substrate;

a plurality of magnetic recording layers of ferromagnetism, wherein the magnetization of each of said magnetic recording layers is oriented in an in-plane direction; and a dividing layer of antiferromagnetism for dividing said plurality of magnetic recording layers from one another through intervening between the magnetic recording layer-to layer;

wherein said dividing layer consists of an alloy in which at least one element of Mn, Ru and Re is added to Cr, and in addition at least one element of Pt and Rh is added.

9. A magnetic storage medium comprising:

a non-magnetic substrate;

a plurality of magnetic recording layers of ferromagnetism;

a dividing layer of antiferromagnetism for dividing said plurality of magnetic recording layers from one another through intervening between the magnetic recording layer-to layer; and a primary layer composed of at least one of a non-magnetic layer consisting of a material having a body-centered cubic structure and an antiferromagnetic layer consisting of a material having a body-centered cubic structure, said primary layer being adjacent to said substrate, wherein one of said plurality of magnetic recording layers is formed adjacent to said primary layer;

wherein said primary layer includes said antiferromagnetic layer, and said antiferromagnetic layer includes Cr and consists of an alloy in which at least one element of Mn, Ru and Re is added to Cr, said alloy having a Néel temperature of 400 K or more.

10. A magnetic storage medium according to claim 9, wherein said primary layer includes said non-magnetic layer, and said non-magnetic layer includes Cr and consists of a material in which Mo or W is added to Cr.

11. A magnetic storage medium according to claim 9, wherein said primary layer includes said antiferromagnetic layer, and said antiferromagnetic layer includes Cr and consists of an alloy in which Mn of concentration between 5 at % and 80 at % is added to Cr.

12. A magnetic storage medium according to claim 9, wherein said primary layer includes said antiferromagnetic layer, and said antiferromagnetic layer includes Cr and consists of an alloy in which Ru of concentration between 2 at % and 18 at % is added to Cr.

13. A magnetic storage medium according to claim 9, wherein said primary layer includes said antiferromagnetic layer, and said antiferromagnetic layer includes Cr and consists of an alloy in which Re of concentration between 2 at % and 14 at % is added to Cr.

14. A magnetic storage medium according to claim 9, wherein said antiferromagnetic layer further includes at least one element of Mo and W.

15. A magnetic storage medium according to claim 9, wherein and said antiferromagnetic layer further includes at least one element of Pt and Rh.

16. A magnetic storage medium according to claim 1, further comprising a protective layer including carbon, said protective layer being formed adjacent to a top layer of said magnetic recording layers.

17. A magnetic storage medium according to claim 1, wherein each of said magnetic recording layers is defined by a product Br·t of between 20 Gauss·$\mu$m and 100 Gauss·$\mu$m where Br denotes a residual flux density of the magnetic recording layers and t denotes a sum total of thickness of the magnetic recording layers.

18. A magnetic storage medium according to claim 2, wherein said substrate is a disk shaped substrate, and said magnetic recording layers are associated with one another such that a direction of a uniaxial crystal magnetic anisotropy of a material constituting each of said magnetic recording layers is substantially coincident with a circumferential direction of the disk shaped substrate.

* * * * *